US006731646B1

(12) United States Patent
Banks et al.

(10) Patent No.: US 6,731,646 B1
(45) Date of Patent: *May 4, 2004

(54) FIBRE CHANNEL SWITCHING SYSTEM AND METHOD

(75) Inventors: David C. Banks, Pleasanton, CA (US); Steven L. Farnworth, Menlo Park, CA (US); Bent Stoevhase, Toronto (CA); Paul Ramsay, Fremont, CA (US)

(73) Assignee: Brocade Communications System Inc, San Jose, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 09/687,933

(22) Filed: Oct. 13, 2000

Related U.S. Application Data

(63) Continuation of application No. 08/823,025, filed on Mar. 21, 1997, now Pat. No. 6,160,813.

(51) Int. Cl.[7] .............................................. H04L 12/28
(52) U.S. Cl. ....................................................... 370/422
(58) Field of Search ................................. 370/412, 422, 370/429, 380, 384, 392, 402, 396, 394

(56) References Cited

U.S. PATENT DOCUMENTS

| 3,649,763 | A | * | 3/1972 | Thompson | ................... | 370/372 |
|---|---|---|---|---|---|---|
| 5,345,228 | A | | 9/1994 | Franaszek et al. | | |
| 5,490,007 | A | | 2/1996 | Bennett et al. | ............. | 359/139 |
| 5,502,719 | A | | 3/1996 | Grant et al. | ............... | 370/58.2 |
| 5,519,695 | A | | 5/1996 | Purohit et al. | ............. | 370/58.2 |
| 5,528,584 | A | | 6/1996 | Grant et al. | ............... | 370/58.2 |
| 5,548,590 | A | | 8/1996 | Grant et al. | .................. | 370/61 |
| 5,592,160 | A | | 1/1997 | Bennett et al. | ............... | 341/58 |
| 5,592,472 | A | | 1/1997 | Grant et al. | ................ | 370/351 |
| 5,603,064 | A | | 2/1997 | Bennett | ...................... | 395/872 |
| 5,610,745 | A | | 3/1997 | Bennett | ...................... | 359/139 |
| 5,892,923 | A | | 4/1999 | Yasuda et al. | | |
| 5,894,481 | A | | 4/1999 | Book | ........................ | 370/412 |
| 6,160,813 | A | | 12/2000 | Banks et al. | ............... | 370/422 |

FOREIGN PATENT DOCUMENTS

EP 0711053 A1 5/1996 ........... H04L/12/44

OTHER PUBLICATIONS

Coudreuse, Jean–Pierre and Servel, Michel; *Prelude: An Asynchronous Time–division Switched Network*; Centre National d'Etudes des Telecommunications—France (1987 EEE), pp. 0769–0773.

* cited by examiner

*Primary Examiner*—Chi Pham
*Assistant Examiner*—Alexander O. Boakye
(74) *Attorney, Agent, or Firm*—Wong, Cabello, Lutsch, Rutherford & Brucculeri L.L.P.

(57) ABSTRACT

A modular Fibre Channel switch includes a data switching path and a message switching path to provide logical point to point connections between switch ports. The data switching path includes a bank of shared SRAM memory devices that are accessed in a time-sliced protocol by each switch port. A receiving switch port writes a data frame to the bank of shared SRAM and the transmitting switch port then reads the data frame from the shared SRAM thereby effecting the logical point to point connection. Because the switch port includes a frame logic circuit that allows for an arbitrary start of frame address, each frame can be written to the first available DRAM device thus eliminating the need to buffer the data frame while waiting for a predetermined DRAM device to cycle in the time sliced protocol. The message switching path includes a message crossbar switch that is barrel shifted in a time sliced fashion to effect message passing among the switch ports. The switch includes a motherboard containing an embedded G_Port ASIC, a message crossbar switch to handle message passing and shared memory that is used to perform data switching. The switch also includes a central processing unit daughter board and external switch port daughter boards.

8 Claims, 11 Drawing Sheets

| 53 MHz | | | | | | | | | | | | | | | | |
|---|---|---|---|---|---|---|---|---|---|---|---|---|---|---|---|---|
| SRAM0 | rx0 | rx1 | rx2 | rx3 | rx4 | | | rx16 | hi-z | tx0 | tx1 | tx2 | tx3 | tx4 |
| SRAM1 | tx16 | hi-z | tx0 | rx1 | rx2 | | | rx14 | rx15 | rx16 | hi-z | tx0 | tx1 | tx2 |
| SRAM2 | tx14 | tx15 | tx16 | hi-z | rx0 | | | rx12 | rx13 | rx14 | rx15 | rx16 | hi-z | tx0 |
| SRAM3 | tx12 | tx13 | tx14 | tx15 | tx16 | | | rx10 | rx11 | rx12 | rx13 | rx14 | rx15 | rx16 |
| ... | | | | | | | | | | | | | | |
| SRAM9 | tx0 | tx1 | tx2 | tx3 | tx4 | | | tx16 | hi-z | rx0 | rx1 | rx2 | rx3 | rx4 |
| SRAM10 | rx16 | hi-z | tx0 | tx1 | tx2 | | | tx14 | tx15 | tx16 | hi-z | rx0 | rx1 | rx2 |
| SRAM11 | rx14 | rx15 | rx16 | hi-z | tx0 | | | tx12 | tx13 | tx14 | tx15 | tx16 | hi-z | rx0 |
| ... | | | | | | | | | | | | | | |
| SRAM16 | rx4 | rx5 | rx6 | rx7 | rx8 | | | tx2 | tx3 | tx4 | tx5 | tx6 | tx7 | tx8 |
| SRAM17 | rx2 | rx3 | rx4 | rx5 | rx6 | | | tx0 | tx1 | tx2 | tx3 | tx4 | tx5 | tx6 | legend:
rx0 — timeslot for port 0's receiver (memory write)
tx0 — timeslot for port 0's transmitter (memory read)
hi-z — bus turnaround cycle (bus not driven)

FIG. 2

| 53 MHz | | | | |
|---|---|---|---|---|
| rx-to-tx queue ptrs | | | | |
| read port | read slot for Finish message processing | read slot for other message processing | read slot for Finish message processing | read slot for other message processing |
| write port | write slot for other message processing | write slot for Finish message processing | write slot for other message processing | write slot for Finish message processing |
| rx buffer descriptors | | | | |
| read port | read slot for Finish message processing | read slot for other message processing | read slot for Finish message processing | read slot for other message processing |
| write port | write slot for other message processing | write slot for Finish message processing | write slot for other message processing | write slot for Finish message processing |
| rx buffer list links | | | | |
| read port | read slot for Finish message processing | read slot for other message processing | read slot for Finish message processing | read slot for other message processing |
| write port | write slot for other message processing | write slot for Finish message processing | write slot for other message processing | write slot for Finish message processing |
| hardware list desc. | update slot for Finish message processing | update slot for other message processing | update slot for Finish message processing | update slot for other message processing |

FIG. 8

FIBRE CHANNEL SWITCHING SYSTEM AND METHOD

This application is a continuation of U.S. Ser. No. 08/823,025, filed Mar. 21, 1997, now U.S. Pat. No. 6,160,813, the contents of which are hereby incorporated by reference.

BACKGROUND OF THE INVENTION

1. Field of the Invention

This invention relates generally to network switching devices and more particularly to Fibre Channel switching devices.

2. Description of the Related Art

The Fibre Channel family of standards (developed by the American National Standards Institute (ANSI)) defines a high speed communications interface for the transfer of large amounts of data between a variety of hardware systems such as personal computers, workstations, mainframes, supercomputers, storage devices and servers that have Fibre Channel interfaces. Use of Fibre Channel is proliferating in client/server applications which demand high bandwidth and low latency I/O such as mass storage, medical and scientific imaging, multimedia communication, transaction processing, distributed computing and distributed database processing applications.

Fibre Channel offers advantages over traditional channel and network technology. Conventional channel technology (e.g., telephony) provides a point-to-point connection (or service) form one device to another. Conventional channels deliver data with high speed and low latency. Channels, however, are not suited for providing connectivity among many clients and are not suited for small-packet bursty traffic. Conventional networks provide shared access to bandwidth and are designed to handle unpredictable and bursty traffic. Networks, however, are software intensive and are not able to meet the growing bandwidth requirements of many client/server applications.

Fibre Channel is an alternative to conventional channel and network connectivity technologies and is used to deliver high speed and low latency connectivity among many clients. Fibre channel establishes logical point-to-point connectivity from a source device node (port) to a destination device node (port) (a logical port-to-port serial channel). The logical port-to-port serial channel is used to transfer data from a source device (node) to a destination device node. Each node (source and destination) has a buffer (either a send buffer or a receive buffer) and data transfer is effected by moving data from the send buffer at the source node to a receive buffer at the destination node. Because the transfer scheme is logically point-to-point (node-to-node) there is no need for Fibre Channel to handle various network protocols. With Fibre Channel, data is moved from one node to another without regard to data format or meaning.

Fibre Channel uses one of several topologies (e.g., a point to point topology, a fabric topology, or a loop topology) to establish a logical point-to-point serial channel. The Fibre Channel point to point topology connects two Fibre Channel systems directly. The Fibre Channel loop topology is an arbitrated loop with ring connections that provide arbitrated access to shared bandwidth. The Fibre Channel fabric topology uses a switching fabric built from one or more Fibre Channel switches to provide a bi-directional connection from one node to another. With the fabric topology, each Fibre Channel node (device) manages only a simple point-to-point connection between itself and the fabric and the fabric manages and effects the connection between the nodes. Each transmitting node (port) enters the address of a destination node (port) in a frame header and the fabric establishes the connection.

Conventional switching systems and methods are not suited for the high bandwidth and low latency requirements of Fibre Channel. Thus, there is a need for an improved switching system and method.

SUMMARY OF THE INVENTION

In accordance with the present invention, a switching system has a data switching path and a message switching path. The data switching path includes a shared memory and memory control circuitry to transfer data frames from a receiving port to a transmitting port with high bandwidth and low latency. The shared memory includes a plurality of memory modules configured for time sliced access (time slicing) by each port. The receiving port writes a data frame to central memory in accordance with a striping method and the transmitting port reads the data frame from central memory to effect the switching of the data frame.

In accordance with the invention, each port is assigned its own time slot for access of each memory module located in central memory. This time slot protocol (time slicing) advantageously permits simultaneous access of the central memory by a plurality of ports. Simultaneous access of central memory is possible because each accessing port is accessing a different memory module in central memory during each time slot. In accordance with the invention, data frames are striped across a plurality of memory modules in central memory. Striping is performed by dividing the data frame into sub-portions and storing each sub-portion in a portion of a memory module. Preferably, the start of the frame is stored in a first memory module and the remaining frame portions are stored in memory modules that are accessed sequentially in accordance with the time slot (time-sliced) protocol (e.g. modules corresponding to sequential time slots).

In accordance with the invention, the memory modules are configured to store each frame in a plurality of contiguous buffer lines. A buffer line is a single memory location across all memory modules. Preferably, a frame buffer comprises 32 buffer lines. Faster switching is obtained by initiating the write of a received data frame in the next available time slot rather than waiting for a time slot corresponding to the physically first memory module (e.g. at the lowest address). This means that the beginning of a frame may start be written to any memory module and not necessarily the physically first memory module. The memory module storing the beginning of the frame (e.g. the start of the frame) is identified to the transmitting port so that the transmitting port initiates reading the frame beginning at the specified memory module. The memory module corresponding to the start of the frame is determined using a counter circuit that is included in the memory control circuitry in the receiving port. The counter circuit determines the buffer line offset associated with a frame written to shared memory. The buffer line offset indicates the memory module offset within the buffer line (e.g., the buffer line offset indicates the memory module that contains the beginning of the data frame). Advantageously, the switching is initiated during the next available time slot and thus decreases switch latency and reduces circuit complexity. The memory control circuitry generates a message indicating which memory module contains the beginning of the frame and then sends the message to a transmitting port. The transmitting port reads the data frame from the central memory, also in accordance with the time sliced protocol, during the time slots it is assigned for access of the various memory modules storing the data frame.

Further in accordance with the invention, messages are passed from a first port to a second port in accordance with a barrel shift protocol. With the barrel shift protocol, a crossbar switch is configured for time-slotted switch reconfiguration in accordance with a predetermined connectivity pattern. Thus, each port has time sliced access to each other port and messages are sent from one port to another by sending the message during the time slot assigned for connection to the destination port.

In accordance with another aspect of the invention, the switch includes a plurality of input/output (I/O) ports, a central (shared) memory coupled to each of the ports, a shared memory access control circuit associated with each port and coupled to each port. The shared memory access control circuit includes receive and transmit control circuits and a counter circuit that determines the buffer line offset that corresponds to the location of the start of the data frame. The switch also includes a message crossbar circuit coupled to each port and an embedded port also coupled to the crossbar switch. The message crossbar circuit is configured to relay messages from a transmitting port to a receiving port through the crossbar switch. The switch also includes central processing circuitry including a central processing unit, bus interface circuitry, memory module, a front panel interface and external network interfaces.

BRIEF DESCRIPTION OF THE DRAWINGS

FIG. 2 is a timing diagram showing the time sliced access of the central memory shown in FIG. 1.

FIG. 8 shows the time-sliced access of the RX-to-TX descriptors shown in FIG. 6.

DESCRIPTION OF THE PREFERRED EMBODIMENT

Figure 1:
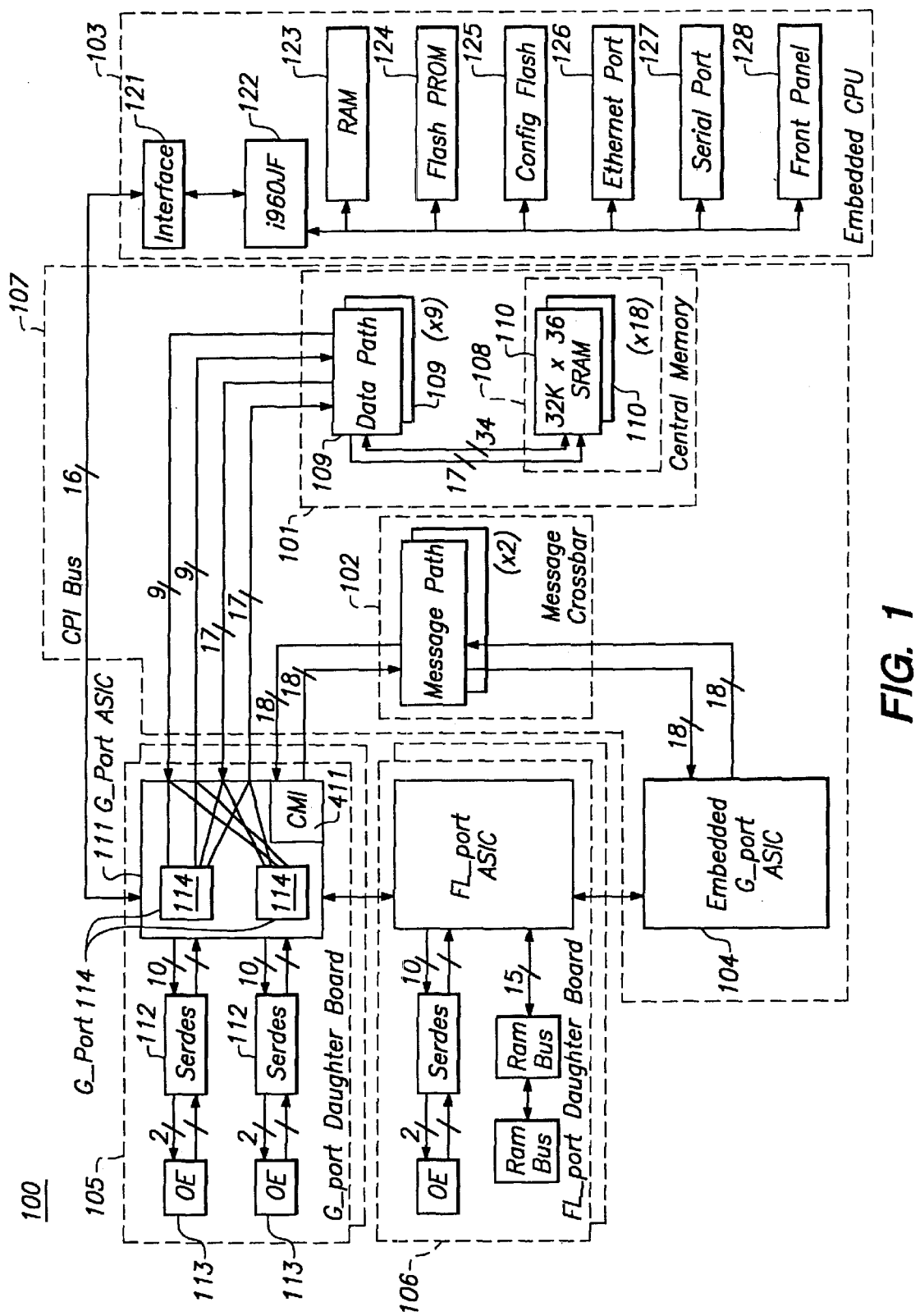
FIG. 1 is a block diagram of Fibre Channel switch in accordance with the present invention.

FIG. 1 is a block diagram of a Fibre Channel switch (switch) 100 in accordance with the present invention. Switch 100 is an ANSI Fibre Channel switch that provides connectivity for up to 16 Fibre Channel complaint device ports (N_Ports). Switch 100 supports class 2, 3 and F service. Class 2 and class 3 service carry N_Port related traffic and Class F is used within the switch fabric for control and management. Advantageously, switch 100 is scalable to allow users to interconnect multiple switches in a topology to build a medium to large Fibre Channel switching fabric. The channel topology can be changed as additional switches 100 are added to the fabric.

Switch 100 includes switch circuit 101, message crossbar 102, embedded central processing unit (CPU) 103 and embedded port 104. Switch 100 also includes G_Port daughter boards 105. G_Port daughter board 105 includes a G_Port ASIC 111, two serdes 112 and two OE devices 113. G_Port ASIC 111 is an application specific integrated circuit that includes circuitry to support two Fibre Channel complaint G_Ports 114. A G_Port 114 is a generic switch port that operates as either an E_Port or an F_Port. An E-Port is an inter-switch expansion port used to connect an E_Port of another switch to build a larger switch fabric. The F_Port is the fabric access port used to connect an N_Port. G_Port daughter board 105 operates in full duplex mode supporting a link speed of 1.0625 Gigabaud. OE devices 113 are conventional optical to electrical conversion devices that convert incoming modulated light signals (optical signals) to serial differential PECL signals. Each OE device 113 is connected to a serdes 112. Serdes 112 is a conventional serializing/deserializing device that converts serial data to parallel data and parallel data to serial data. Each serdes 112 couples serial data received from OE devices 113 to G_Port ASIC 111 and also couples parallel data received from G_Port ASIC 111 to OE device 113.

G_Port ASIC 111 is an application specific integrated circuit that provides two Fibre Channel ports (G_Ports 114) that connect to external N_Ports (as an F_Port) or to other switches 100 (as an E_Port). Each G_Port 114 couples data received from serdes 112 to switch circuit 101 or to message crossbar 102.

Embedded CPU 103 includes a CPI bus interface 121, a processor 122, RAM 123, Flash PROM 124, configuration flash memory 125, an ethernet port 126, a serial port 127 and a front panel logic 128. Embedded CPU 103 is a daughter board that plugs into mother board 107. Embedded CPU 103 is responsible for switch 100 initialization, configuration and management.

Processor 122 is an Intel i960JF processor, with a clock speed of 25 MHz. RAM 123 is 4 MByte of DRAM coupled to processor 122. RAM 123 stores firmware text and data structures. Ethernet port 126 is a serial port, 10 BaseT ethernet port. Flash PROM 124 is a FLASH EPROM for firmware text and initialized data, and for storing switch 100 configuration information. Front panel logic 128 is a logic circuit that enables processor 122 to display characters on the front panel and to read the state of the front panel buttons.

CPI bus interface 121 includes a sixteen bit bidirectional multiplexed address/data bus, radial selection lines (one per G_Port 114), and an acknowledgment line (shared for all ports). All bus transactions are initiated by the embedded CPU 103. The CPI bus operates asynchronously to the embedded CPU 103 and Fibre Channel clocks. This allows for relaxed timing on the bus (which may be heavily loaded in switches with many ports). In addition, it allows the processor 122 clock to be a different frequency from that of the Fibre Channel G_Ports 114.

Mother board 107 includes circuitry to perform the switching function (e.g., message crossbar 102, switch circuit 101 and embedded Port 104). Embedded port 104 is a logical N_Port responsible for Fibre Channel link control, switch management, routing table management and address assignment/management functions. Embedded port 104 manages class F services and the related protocols as defined in the Fibre Channel standards (FC-PH rev 4.3, FC-GS rev 3.0, FC-GS2 rev 0.1, FC-SW rev 3.0, FC-PH2 rev 7.3). Embedded port 104 also works, as an SNMP agent, a Fibre Channel name server and an alias server to assist multicast and broadcast functions. Flash memory (not shown) is associated with embedded CPU 103 to support field firmware updates, providing easy adaptation to changes and enhancements. Switch circuit 101 includes a central memory 108 and a data path control circuit 109. Central memory 108 is a bank of 18 32Kx36 SRAM modules 110.

The switching function of switch 100 is based on central memory 108 and data path control circuits 109. Each G_Port 114 stores received frames in central memory 108, passing a buffer pointer to the forwarding port's transmitter. The forwarding port is another G_Port 114.

In this central memory architecture, a set of buffers in central memory 108 is assigned to each G_Port 114, to be used for receipt of frames. As a G_Port 114 receives and validates a frame, it stores the frame in one of its receive buffers in central memory 108 and forwards a routing request to the appropriate destination G_Port 114. When the destination G_Port 114 is capable of transmitting the frame, it reads the frame contents from central memory 108 and forwards the frame to its transmit interface. Once the destination G_Port 114 has removed an entry for a frame from its internal transmit queue in preparation for frame transmission, the destination G_Port 105 sends a "transmission complete" Finish message to the G_Port 114 that received the frame, allowing the receiving G_Port 114 to reuse the buffer in central memory 108 for subsequent frames received.

Each SRAM module 110 in central memory 108 is shared for all G_Ports 114, and is accessed in a time-sliced fashion.

FIG. 2 shows a time-slicing timing diagram in connection with access of the central memory 108 shown in FIG. 1. The nomenclature "rx0" through "rx15" refers to received data written to central memory 108 for each of the externally-accessible G_Ports 114, while "tx0" through "tx15" indicates data read from central memory 108 for each G_Port 114, "rx16" and "tx16" denote buffer write and buffer read timeslots allocated for use by the embedded CPU 103.

The access of each SRAM module 110 is time-sliced between receive and transmit functions for all G_Ports 114. In addition, the accesses to each SRAM module 110 for a given G_Port 114 are sequenced such that each G_Port 114 has a time-slice (time slot) in a different SRAM module 110 every two clocks. Since the number of bits read from or written to an SRAM module 110 in a single clock are twice the number transferred between a G_Port 114 and the data path chips 109, this allows an uninterrupted stream of words to be exchanged between each G_Port 114 and the aggregate central memory 108 in each direction (transmit and receive). In this fashion, the data from each G_Port 114 is "striped" across all SRAM modules 110 in the central memory 108.

To prevent simultaneous driving of the data bus coupled to central memory 108 by SRAM modules 110 and the data path control circuits 109, a "bus turnaround" cycle is required whenever switching between memory reads and memory writes. To minimize the number of bus turnaround cycles, a complete cycle through a memory is set up to: (i) do all memory writes (receipt of data) for all G_Ports 114; (ii) perform a bus turnaround cycle, (iii) do all memory reads (data transmission); (iv) and then perform a bus turnaround cycle in preparation for the next cycle. This results in a total memory cycle of 36 clocks for 17 ports.

Figure 10:
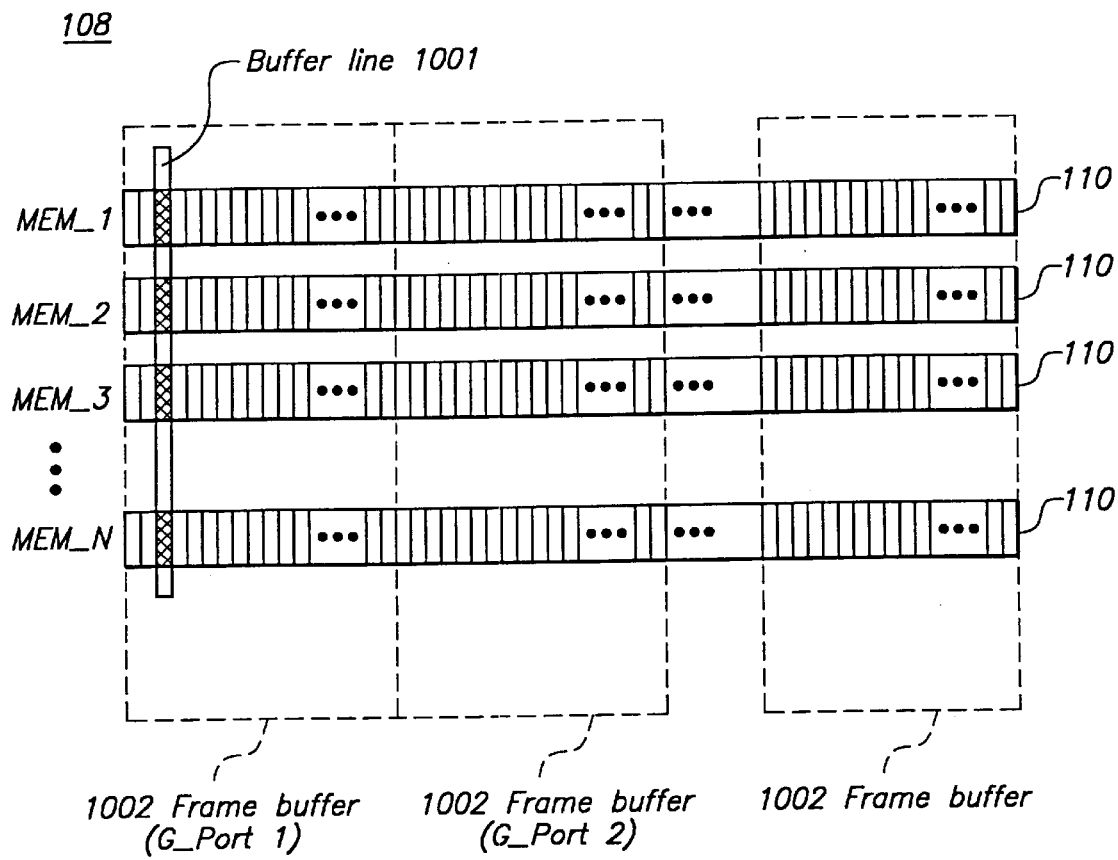
FIG. 10 is a diagram showing the organization of memory modules in the central memory shown in FIG. 1.

FIG. 10 illustrates the arrangement of SRAM modules 110 in central memory 108. Each G_Port 114 is allocated a portion of each SRAM module 110 for storing a data frame. Data frames are stored across (striped across) SRAM modules 110. Striping generates buffer lines 1001. A buffer line 1001 is the data contained in a single memory location across all SRAM modules 110. Central memory 108 is divided into frame buffers 1002. Each frame buffer 1002 includes 32 buffer lines, for a total frame buffer capacity of 2304 bytes per frame. Each G_Port 114 writes frames into its corresponding assigned frame buffer 1002 starting with the next available SRAM 110 time slot. Advantageously, each G_Port 114 writes to its associated frame buffer 1002 storing the beginning of the frame in an arbitrary SRAM module 110 in the first buffer line of the frame buffer (which ever SRAM module 110 is the next available). The 36 bits in each memory device are used to store 32 bits (four bytes) of data plus one frame delimiter indicator bit, and a single parity bit. The remaining two data bits are unused. Since the memory configuration includes 18 SRAM modules 110, each buffer line may be used to store 72 bytes of data (18 SRAM modules 110, times 4 bytes per device).

The data paths coupling the G_Ports 114 and central memory 108 are 17 bits wide, and thus two clocks are required to transfer a complete 34 bit word to or from memory. The first 17 bits transferred are used to construct the high order 16 bit halfword of the buffer data plus the frame delimiter bit. The second 17 bits transferred are directed to the low order 16 bit halfword, with the seventeenth (highest) bit providing the worldwide parity. Odd parity is used.

Embedded CPU 103 assigns a set of contiguous buffers to be used for received frames to each G_Port 114. A maximum of 128 buffers may be allocated to any single G_Port 114.

The last frame buffer in central memory 108 may not be used for buffering of frames. When no frame data is being received, the received data timeslots for each G_Port 114 will still cause writes to memory to occur. To avoid corrupting any frame data, the last buffer line in the last frame buffer is used as a "scratch" area, where writes to memory will be directed in the absence of received data.

Figure 3:
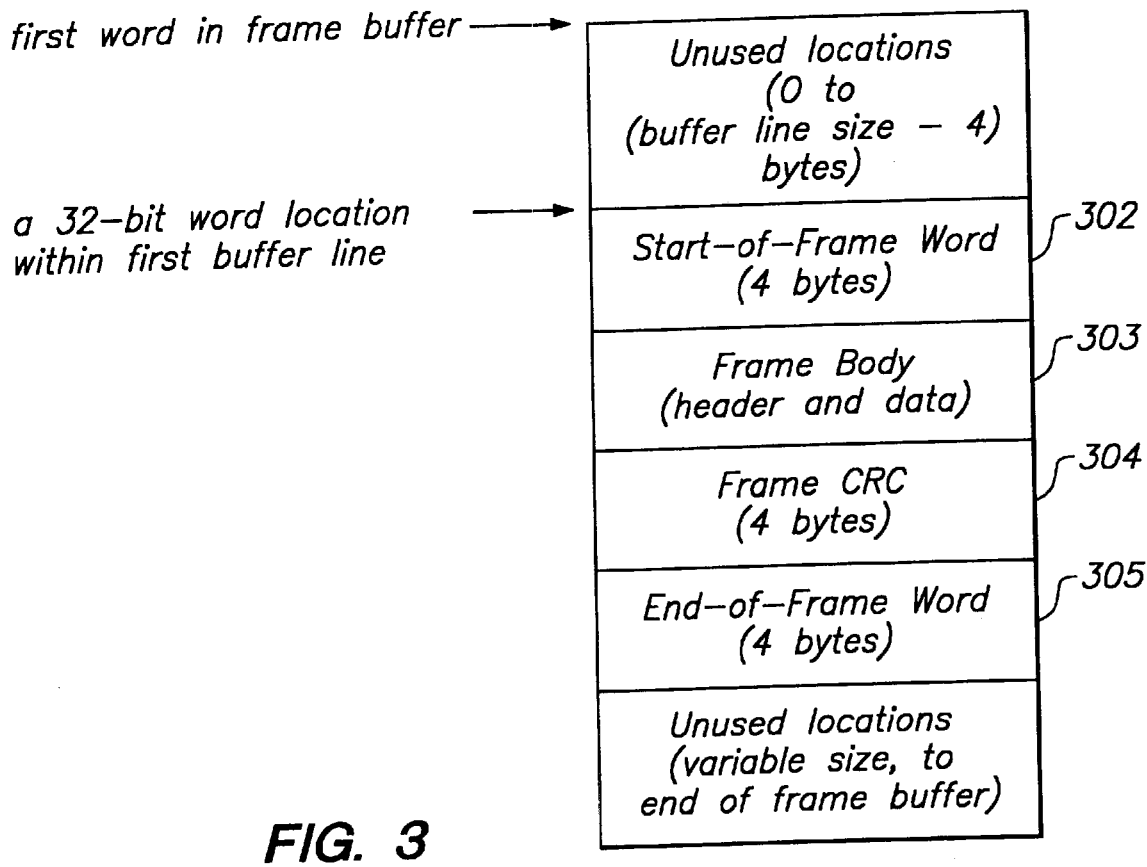
FIG. 3 shows the format of a frame used in the switch shown in FIG. 1.

FIG. 3 shows the format of a frame 300 in central memory. Frame 300 includes a first unused portion 301, a start-of-frame word 302, a frame body 303, a frame CRC (cyclic redundancy code) 304, an end-of-frame word 305 and a second unused portion 306. The frame body 303 includes 24 bytes of Fibre Channel frame header and between zero and 2112 bytes of frame payload. The frame CRC 304 includes a "frame delimiter" bit set; the "frame delimiter" bit will be zero for all other central memory words occupied by a frame.

As a frame 300 is received, the receiving G_Port 114 decodes the frame 300 and then starts writing the frame into the first buffer line of a buffer in central memory 108. To minimize latency, G_Port 114 starts writing the frame into whichever SRAM module 110 is being used for that G_Port 114 at the time (e.g., into the SRAM module 110 corresponding to the next available time slot). This means that the start-of-frame word 302 may be located at any offset within the first buffer line of a frame buffer. When forwarding frames 300 to a transmitting G_Port 114, the offset of the start-of-frame within the buffer line is conveyed as part of the Put message. The transmitting G_Port 114 is required to wait until its timeslot occurs in the central memory 108 in which the start-of-frame is located before beginning frame transmission, resulting in some latency before transmission may begin. The maximum latency that may occur as a result of the timeslicing of the memories is the total time required to sequence through all receivers and transmitters.

In general, for frames 300 forwarded from receiving G_Port 114 to a transmitting G_Port 114, the frame body 303, and frame CRC 304 are copied directly from the received data stream, with no modifications applied by switch 100. The start-of-frame and end-of-frame words 302, 305, however, are in a condensed format, to allow additional information used by the switch 100 to be encoded in these words.

Table 1 shows the format of start-of-frame word 302 stored in the frame buffer.

TABLE 1

| Bit(s) | Start-of-Frame Word Function |
|---|---|
| 31–27 | Reserved |
| 26–24 | Start-of-Frame Delimiter |
|  | = 0,0,0 for SOFf |
|  | = 0,0,1 for SOFc1 |
|  | = 0,1,0 for SOFi1 |
|  | = 0,1,1 for SOFn1 |
|  | = 1,0,0 for SOFi2 |
|  | = 1,0,1 for SOFn2 |
|  | = 1,1,0 for SOFi3 |
|  | = 1,1,1 for SOFn3 |
| 23–1 | Reserved |
| 0 | Check/generate CRC on Transmission |
|  | = 0 to check CRC |
|  | = 1 to generate CRC |

For normal frame forwarding, the receiving G_Port 114 encodes the start-of-frame word 302 as shown, and sets bit 0 to a "0" to indicate that the frame CRC 304 from the buffer is to be forwarded to the destination G_Port 114 with no modifications. Frames 300 generated by embedded CPU 103 have the same format, except that bit 0 is generally a "1", indicating that the transmitting G_Port 114 is to generate a frame CRC 304 and insert it in the frame to be transmitted.

Table 2 shows the format of end-of-frame word 305 stored in the frame buffer.

TABLE 2

| Bit(s) | End-of-Frame Word Function |
|---|---|
| 31–27 | Reserved |
| 26–24 | End-of-Frame Delimiter |
|  | = 0,0,0 for EOFt |
|  | = 0,0,1 for EOFdt |
|  | = 0,1,0 for EOFa |
|  | = 0,1,1 for EOFn |
|  | = 1,0,0 for EOFdti |
|  | = 1,0,1 for EOFni |
| 23–11 | Reserved |
| 10 | Incorrect S_ID in received frame |
| 9 | Invalid class-of-service |
|  | (set for class 1 frames and for some class F frames) |
| 8 | Invalid unicast virtual channel ID |
| 7 | Invalid multicast class-of-service |

TABLE 2-continued

| Bit(s) | End-of-Frame Word Function |
|---|---|
| 6 | Unroutable D_ID format |
| 5 | D_ID not in routing tables |
| 4 | Maximum frame size exceeded |
| 3 | Truncated frame detected |
| 2 | Invalid End-of-Frame delimiter detected |
| 1 | Encoding or disparity error detected |
| 0 | Incorrect CRC |

The end-of-frame word 305 bits indicate the type of delimiter received. If an error is detected on the inbound (received) frame 300, one of the error flags in bits 0 through 10 is set by the receiving G_Port 114 before the end-of-frame word 305 is written to central memory 108; this causes the transmitting G_Port 114 to change the frame delimiter to an end-of-frame normal-invalid as it is sent to the destination G_Port 114 (if the error is not one that causes the frame to be forwarded to the embedded G_Port 104). The end-of-frame word 305 includes the following flags:

(1) Incorrect CRC Flag.

The "Incorrect CRC" flag if set by the receiving G_Port 114 if its CRC checker has detected a bad CRC. Frames 300 with this error condition are still forwarded to the destination G_Port 114.

(2) Encoding or disparity error detected Flag.

An "Encoding or disparity error detected" error is flagged by the receiving G_Port 114 if a problem has been detected by the 8b/10b decoding logic. As with Incorrect CRC, frames 300 with this sort of error are transmitted to the destination G_Port 114, with the end-of-frame delimiter changed to EOFni.

(3) Invalid End-of-Frame Flag.

If a frame 300 is terminated with an ordered set containing a K28.5 character which is not a valid end-of-frame delimiter, the "Invalid End-of-Frame delimiter detected" bit is set. This condition causes the frame to be transmitted to the destination port with an EOFni delimiter replacing the invalid frame delimiter.

(4) Truncated frame detected Flag.

Frames 300 with fewer than 28 bytes between the start-of-frame and end-of-frame delimiters (corresponding to 24 bytes of header plus four bytes of CRC) cause a "Truncated frame detected" error. Again, frames with this sort of error are forwarded to the destination G_Port 114, with an EOFni appended.

(5) Maximum frame size exceeded Flag.

The "Maximum frame size exceeded" bit is set if the frame body exceeds 24 bytes of header plus 2112 bytes of payload plus the CRC. Frames 300 with this sort of error are also be forwarded to the destination physical port.

(6) D_ID not in routing tables Flag.

If a D_ID format supported by switch 100 is found in the received header, but no valid entry corresponding to the D_ID is discovered in the routing tables, the "D_ID not in routing tables" bit is set. In this case, the frame is not sent to any destination physical port, but is forwarded to the embedded G_Port 104 (the embedded fabric port) instead.

(7) Invalid D_ID format Flag.

Certain combinations of fields in a D_ID are not used by switch 100. In this case, the "Invalid D_ID format" bit is set, and the frame 300 is forwarded to embedded CPU 103 rather than to any physical fabric port (e.g. a G_Port 114).

(8) Invalid Multicast class-of-service Flag.

The "Invalid multicast class-of-service" bit is set if a frame addressed to a multicast group is not a class 3 frame. Frames of this sort are forwarded to the embedded G_Port 104 to allow generation of a F_RJT response.

(9) Invalid unicast virtual channel ID Flag.

Unicast traffic is carried on virtual channels 0 through 5 and therefore, any frames received with a value of 6 or 7 in the virtual channel field of the D_ID are flagged with a "Invalid unicast virtual channel ID" error. Frames 300 that fall in this category are also sent to the embedded G_Port 104.

(10) Invalid Class-of-Service Flag.

All frames received with class 1 start-of-frame delimiter cause the "Invalid class-of-service" indicator to be turned on. As the appropriate response for such frames is an F_RJT, frames of this type are forwarded to the embedded G_Port 104. In addition, class F frames directed to any address except an embedded G_Port 104 will also cause the "Invalid class-of-service" bit to be set.

(11) The Incorrect S_ID Flag.

If a frame is received, S_ID checking is enabled, and the frame's S_ID field does not match the S_ID programmed for the port, the "Incorrect S_ID is received frame" bit will be set. Frames with this error will be forwarded to the embedded CPU 103.

Figure 4:
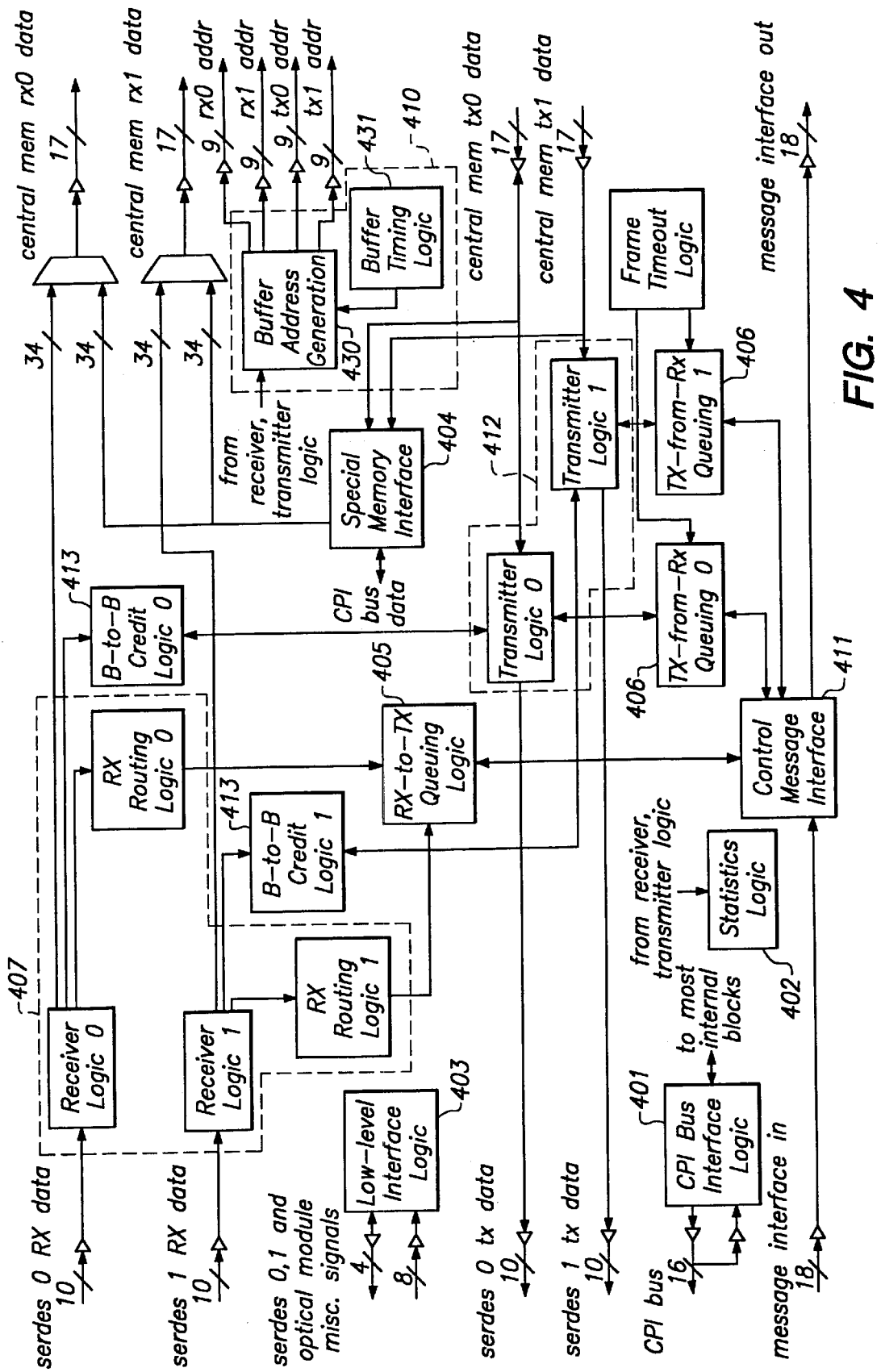
FIG. 4 is a functional block diagram of a G_Port ASIC shown in FIG. 1.

FIG. 4 is a functional block diagram of a G_Port ASIC 111 in accordance with the present invention. G_Port ASIC 111 includes CPI interface circuit 401, statistics logic 402, low level interface logic 403, special memory interface 404, RX-to-TX logic 405, TX-from-RX circuit 406, receiver logic 407, buffer circuit 410, control message interface 411, transmitter logic 412 and Buffer-to-Buffer Credit logic 413.

CPI interface circuit 401 interfaces various G_Port ASIC 111 registers (not shown) to embedded CPU 103. G_Port ASIC 111 registers include registers that control configuration, initialization and interface information. Transmitter logic 412 is a transmission circuit that couples data to serdes circuit 112. Low level interface logic 403 provides embedded CPU 103 with the ability to monitor and define various interface signals used in serdes circuit 112.

Buffer circuit 410 includes Buffer address generation 430 and Buffer timing logic 431. Buffer time logic 431 is a counter circuit that determines the buffer line offset and conveys time slot timing information to other portions of the G_Port ASIC. A buffer line offset indicates the SRAM module 110 at which a frame buffer starts. Buffer timing logic 431 also maintains time slot information for message crossbar 102.

Figure 12:
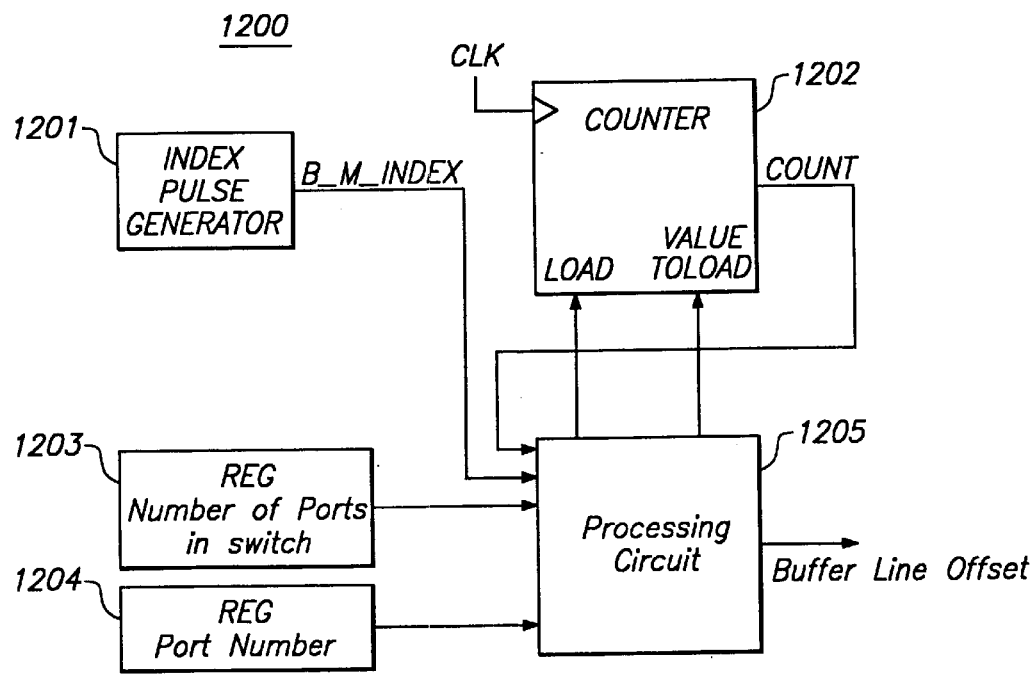
FIG. 12 is a functional block diagram of a circuit included in the buffer logic shown in FIG. 4.
Figure 13:
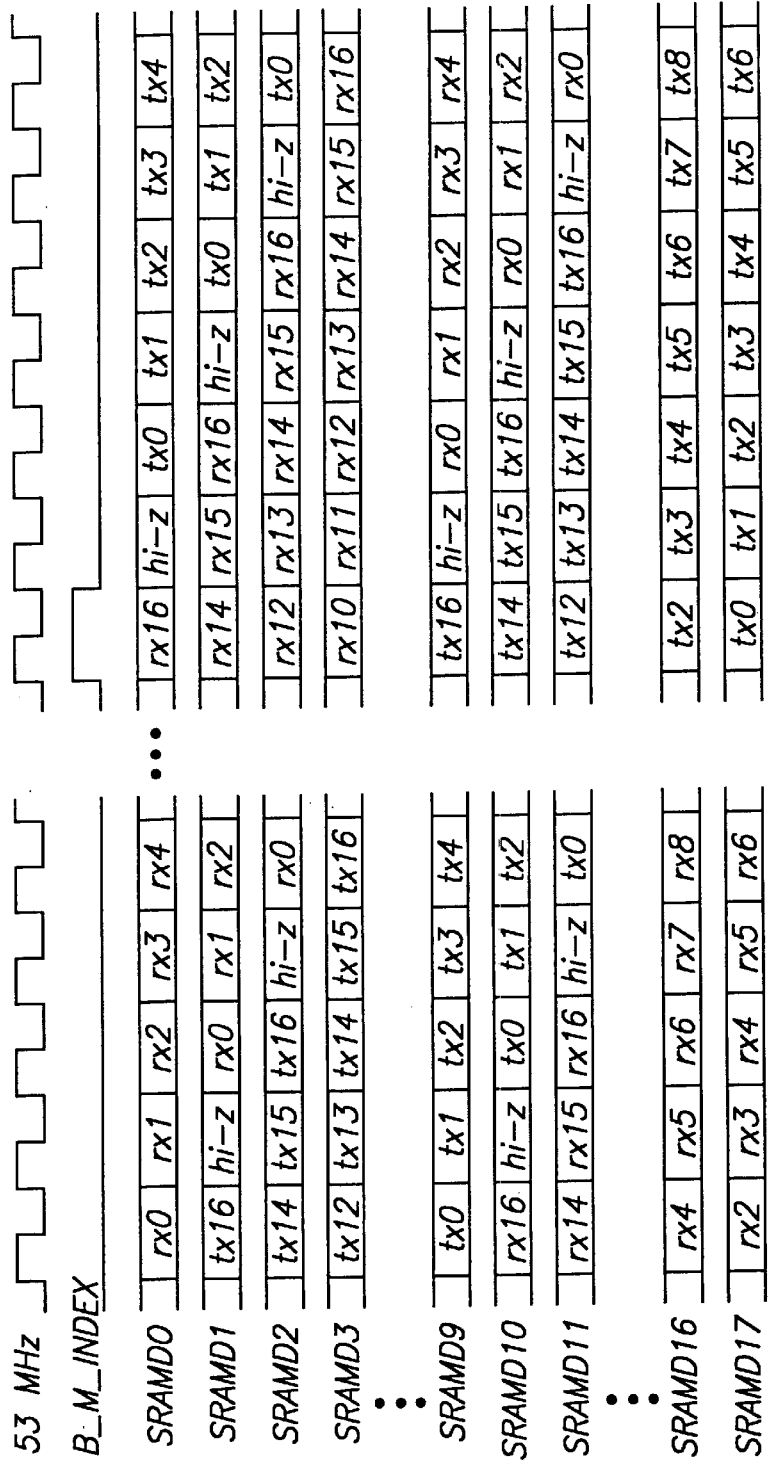
FIG. 13 shows the timing of the B_M_Index pulse relative to the time slots associated with the CMI circuit shown in FIG. 4.

FIG. 12 is a functional block diagram of a circuit 1200 included in buffer logic 410 that generates a buffer line offset signal indicating the memory module corresponding to the start of a data frame. Circuit 1200 receives an index pulse signal from an index pulse generator 1201 (included on mother board 107). Circuit 1200 includes a counter 1202, registers 1203 and 1204 and processing circuit 1205. Index pulse generator 1201 generates a pulsed output, "B_M_Index", which is asserted once per cycle or "rotation" of central memory 108. The index pulse is distributed to all G_Port ASICs 111, switch circuit 101 and message crossbar 102 to coordinate the time-slicing between all of these devices. A cycle or a rotation through central memory 108 is a cycle through all G_Ports 111 for transmitters and receivers. FIG. 13 shows the timing of the B_M_Index pulse relative to the time slots. Counter 1202 has a clear input that is coupled to an output of processing circuit 1205. Register 1203 stores the number of ports in switch 100 and register 1204 stores the port number. Processing circuit 1205 is coupled to the output of counter 1202 and to the outputs of registers 1203 and 1204. Processing circuit 1205 generates a buffer line offset responsive to the count and the values in registers 1203 and 1204. The buffer line offset indicates the memory module containing the start of the data frame. Processing circuit 1205 also calculates a values to be loaded into counter 1202 based on the number of ports in switch 100 and the value stored in port number register 1204.

Figure 5:
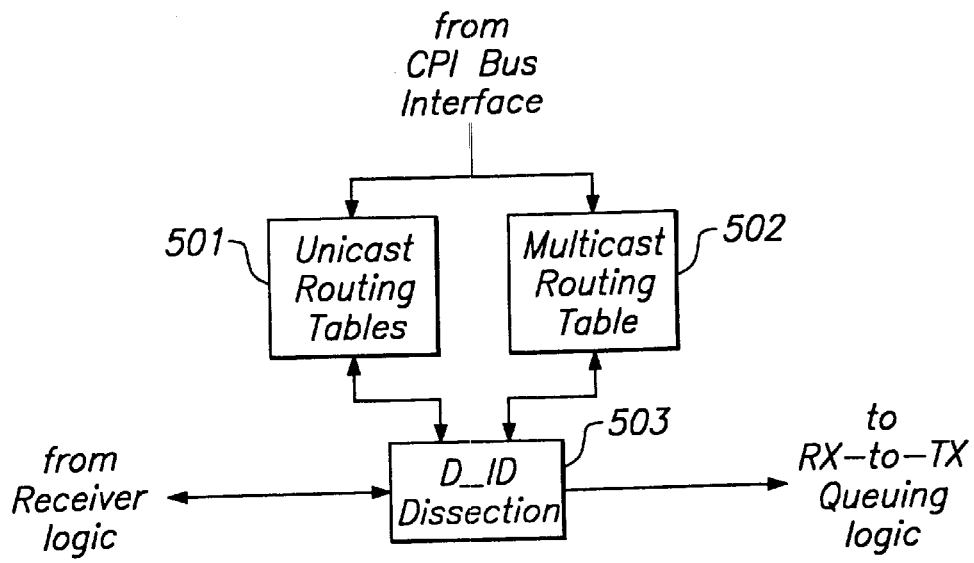
FIG. 5 is a functional block diagram of the routing logic shown in FIG. 4.

Receiver logic 407 is circuitry that provides the interface between serdes circuit 112 and various logic circuits internal to G_Port ASIC 111. Receiver logic 407 includes Rx routing logic 408 and buffer credit logic 409. FIG. 5 is a block diagram of the Rx routing logic 408. Rx routing logic 408 includes routing tables (501, 502) and D_ID dissecting circuit 503. D_ID dissection circuit 503 uses routing tables 501, 502 to determine the destination physical port (e.g., a G_Port 111) within the local fabric (e.g. within switch 100) to which a frame is to be routed. D_ID dissection circuit 503 uses the destination ID and class of service information captured by receiver logic 407 and generates a virtual channel number and a destination physical port number (or destination port bit mask in the case of multicast) to be sent to the RX-to-TX logic 405. Additionally, certain routing-related error signals are passed back to receiver logic 407 for inclusion in the end-of-frame word 305 in the frame buffer. D_ID dissection circuit 503 also generates signals forwarded to the RX-to-TX logic 405 that indicate whether the frame is unicast or multicast and whether the frame is to be processed by embedded CPU 103.

Special memory interface 404 is circuitry that controls the interface between embedded CPU 103 and central memory 108. Statistics logic 402 is a circuit that maintains a number of statistics on frame traffic for each G_Port 114.

G_Port ASIC 111 includes two TX-from-RX circuits 406. Each TX-from-RX circuits 406 is associated with each G_Port 114 transmitter within a G_Port ASIC 111 to queue frame transmission requests from receivers within the local fabric element (e.g., within switch 100). Each TX-from-RX logic 406 handshakes with a transmitter logic 412 to send frames from central memory 108 to the serdes circuit 112. In addition, it monitors the state of signals from the Buffer-to-Buffer Credit logic 413 to determine which virtual channels have transmit credit, and sends signals to this logic to indicate when a frame has been sent on a particular virtual channel.

Figure 6:
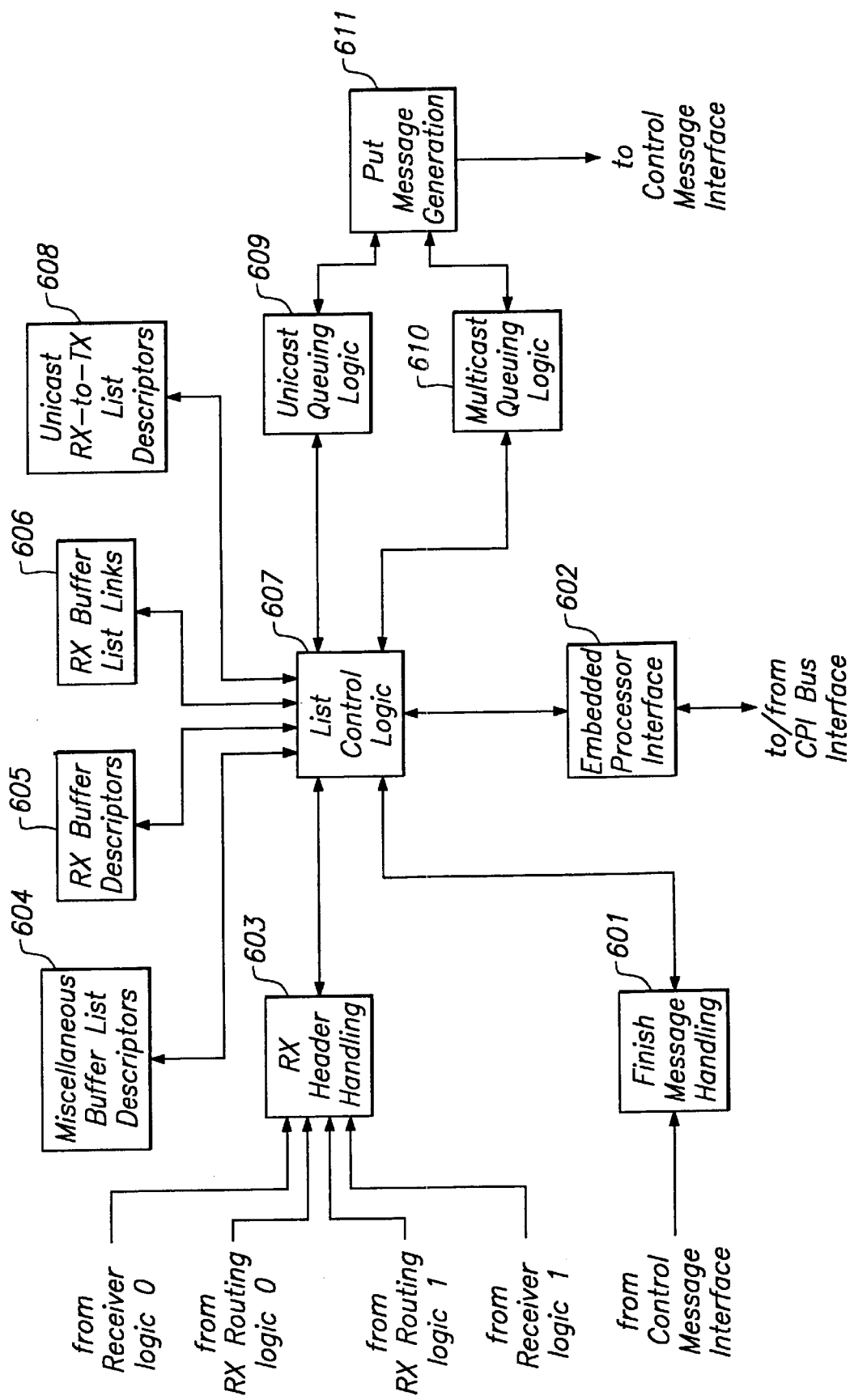
FIG. 6 is a functional block diagram of the RX-to-TX logic circuit shown in FIG. 4.

RX-to-TX logic 405 controls the buffering of data frames received from receiver logic 407. FIG. 6 is a functional block diagram of RX-to-TX logic 405. RX-to-TX logic 405 includes Finish Message handler 601, embedded processor interface 602, RX header handling 603, misc buffer list descriptors 604, RX buffer descriptors 605, RX Buffer list links 606, list control logic 607, unicast list descriptors 608, unicast queue logic 609, multicast queue logic 610 and Put Message generator 611.

G_Port ASIC 111 provides an array of 128 buffer descriptors for each G_Port 114, corresponding to a maximum of 128 received frame buffers. Each buffer descriptor may be linked into one of a number of lists, depending on the state of the associated receive buffer. The format of a receive buffer descriptor is shown in Table 3 below.

TABLE 3

RX Buffer Descriptor Format

| Bit(s) | Function |
| --- | --- |
| 12 | End_Sequence bit from F_CTL |
| 11–7 | Timeout Deadline |
| 6–0 | Line Offset for Start-of-Frame |

The End_Sequence bit is passed in a Put Message to the transmitter. This bit is used by the priority logic. The Timeout Deadline is passed in a Put Message to the transmitting G_Port 114, where detection of frame timeouts occur. It is used to determine whether a timeout has occurred and is also written to RX buffer descriptors 605 as part of header processing on received frames. The Line Offset for Start-of-Frame is taken from buffer logic 410 as the start-of-frame word is being written to central memory 108 for a received frame. This parameter, also passed to the transmitting G_Port 114 in a Put Message, is recorded in RX buffer descriptors 605 during received header processing.

The list link field for a received buffer is used to construct RX Buffer list links 606, to create a linked list of received buffers. The link contains the port's buffer number for the next receive buffer in the list, plus an additional bit (the most significant bit) to indicate the port number of the linked buffer. In general, the end of a list is detected by comparing the buffer number against the tail pointer of the list of interest, rather than checking for a "null" list link in the buffer descriptor. This saves writes to the buffer descriptor for various queue manipulation operations.

G_Port ASIC 114 maintains a separate linked list of receive buffer descriptors (unicast list descriptors 608) for each unicast virtual channel (6) on each possible transmitter (64) in a switch 100 (excluding the embedded G_Port 104). Each unicast list descriptor 608 is shared between the two receivers (receiving G_Ports 114) of G_Port ASIC 111. A single 384 word by 16 bit RAM is used to store the list pointers. The format of a list descriptor entry in this RAM is shown below in Table 4.

TABLE 4

Unicast RX-to-TX Queue List Descriptor Format

| Bit(s) | Function |
| --- | --- |
| 15–8 | List Head Pointer |
| 7–0 | List Tail Pointer |

As with the links within a buffer descriptor, the most significant bit of each pointer indicates the G_Port 114 within the G_Port ASIC 111, while the remaining seven bits denote the buffer number within the designated port.

Misc buffer list descriptors 604 are linked lists that have hardware register head and tail pointers (seven bits each) to handle various states of received buffers. The lists include a Free Buffer List, a Timed-Out Buffer List, a Processing Required List, a Transmitter Unavailable List, and a Receiver Flushed List.

List Control Logic 607 controls a variety of operations that may be performed involving the Unicast List Descriptors 608 and the RX Buffer Descriptors 605. Note that the "list link" field may be written independently of the remainder of an RX-to-TX Buffer Descriptor. This eliminates the requirement to perform a read-modify-write on a buffer descriptor entry when appending new buffers to the tail of existing lists.

In general, the list descriptors and the buffer descriptors are accessed together. Since Finish messages may arrive from CMI 411 once every two clocks, the descriptors are accessed in a time-sliced fashion, with Finish Message processing using every other timeslot of central memory 108.

FIG. 8 shows the time-sliced access of the RX-to-TX descriptors 608. A time-slice on each port is one clock long, with the time-slices allocated on the read ports being out of phase with those on the write port. The result of this is that Finish messages are allowed to use the read ports of the RAMs in one clock, the write ports of the RAMs on the next clock, the read ports of the RAMs on the following clocks, and so on, with a read and write access once every two clocks. Other "users" of the descriptors have the same access to the RAMs as for Finish message processing, but interleaved with the Finish message timeslots.

Table 5 shows the elements that may access the buffer lists in the non-Finish-message timeslots. The arbitration is performed on a fixed-priority basis. Of the priorities listed in the table, level 0 is the highest.

TABLE 5

Buffer List Access

| Priority | # of timeslots | Function |
| --- | --- | --- |
| 0 | 1 | Received headers, port 0 |
| 1 | 1 | Received headers, port 1 |
| 2 | 1–2 | Embedded CPU accesses |
| 3 | 1–2 | Outbound Put Messages |

Figure 9:
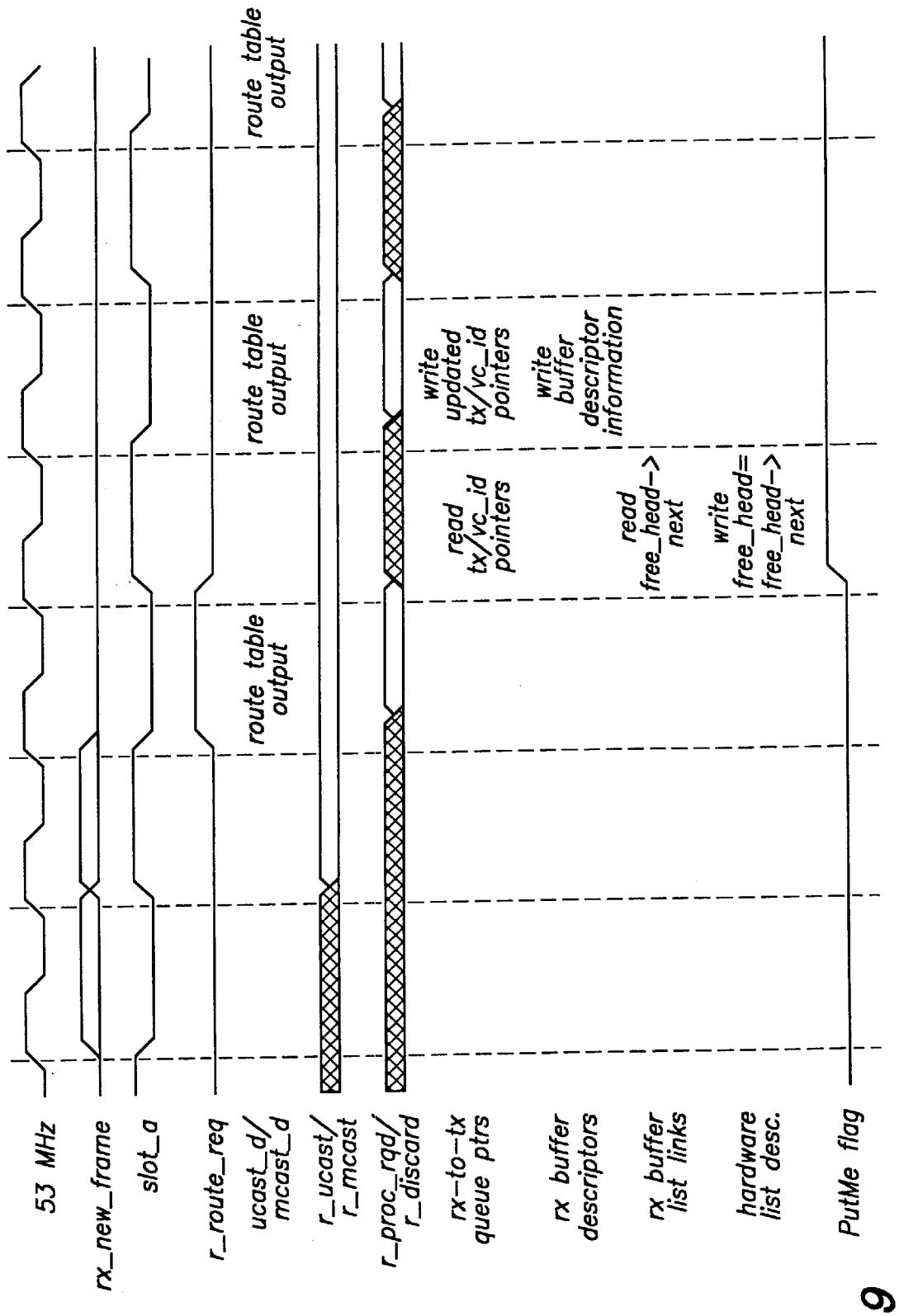
FIG. 9 is timing diagram showing the generic form of a queuing operation for a multicast or a unicast frame.

The "Received header" entries noted in the table apply to both unicast and multicast frame processing. Note that the priority for port 0 is higher than that for port 1. This is somewhat arbitrary, and should not affect performance or reliability, as the time required to perform received header processing in terms of the cycles used in the buffer lists is short relative to a minimum frame time. Using a fixed priority scheme simplifies the circuit implementation. FIG. 9 shows the generic form of a queuing operation for a unicast or multicast received frame.

During the clock where rx_routed is asserted, the queuing logic 609, 610 arbitrates for use of the next read slot in the following clock. If the received frame is unicast, the output of the routing table (the transmitter number) will be captured, as well as the virtual channel number. In addition, the various flags produced by the RX Routing logic (in receiver 407) are captured.

In the clock following the assertion of rx_routed (or in a subsequent clock where slot_a is asserted), a read cycle to the various RX-to-TX Queuing logic RAMs will be performed to handle the received header. In the following clock (slot_a negated), any writes associated with the received header processing will be performed.

In general, when slot_a is asserted, the following operations will be performed:

(i) generate RX-to-TX Queue RAM read addresses for Finish slot (Finish read actually occurs when slot_a is negated). Note that all RAM addresses are generated in the clock preceding the one in which they are used.

(ii) generate RX-to-TX Queue RAM read addresses for non-Finish slot. Since RAM reads for non-Finish slots occur when slot_a is asserted, the writes for these slots occur when slot_a is negated.

When slot_a is negated, the following operations will be performed:

(i) arbitrate for use of the non-Finish slot. The RAM read address used for non-Finish operations is generated during this clock (simultaneous with the arbitration operation), to be used in the following clock (when the RAM read for the non-Finish operation actually occurs).

(ii) generate the RAM write address for Finish operations. The time-slice when slot_a is negated is actually the one in which the RAM read for a Finish operation occurs; so, this is also the clock in which the RAM write address (to be used in the subsequent clock) is generated.

Embedded processor interface 602 handshakes with list control logic 607 to perform various list additions and deletions, as well as perform direct access to RX buffer descriptor 605.

The RX routing logic for each G_Port 114 forwards destination physical port information and RX header indication signals to RX Header Handler 603. RX Header Handler 603 then appends the corresponding buffer to the appropriate received buffer list. For normal unicast frames, the buffer is added to a Unicast list descriptor 608, and an entry is added in the Unicast Queuing logic 609. For frames directed to the embedded CPU 103, the buffer is appended to the Processing Required list (one of the miscellaneous list descriptors 604). An interrupt may be generated to the embedded CPU 103 when this list is not empty.

Received multicast frames cause an entry to be added in the Multicast Queuing logic.

Finish Message handler 603 takes inbound Finish messages addressed to one of the two Fibre Channel ports (G_Ports 114), and updates the received buffer lists (RX Buffer descriptors 605 and RX buffer linked list 606).

Unicast Queuing logic 609 keeps track of when Put Messages must be generated to a particular destination transmitter (G_Port 114) on a virtual channel. To accomplish this, a set of hardware flags is used. There is a "Unicast PutMe" flag associated with each unicast virtual channel on every possible destination transmitter. Since unicast traffic can be directed only to physical switch ports and not to the embedded CPU 103, this requires a total of (64 ports times 6 unicast virtual channels)=384 PutMe flags. All PutMe flags are cleared by a G_Port reset. As the first entry is added to a unicast queue for a particular transmitting G_Port 114, the corresponding PutMe flag is set. Unicast Queuing logic 609 arbitrates between all PutMe flags, and forwards the resulting information to the Put Message Generator 611. Unicast Queuing logic 609 performs a cycle to read the appropriate RX Buffer Descriptor entry (in RX buffer descriptors 605) to get the remaining fields required to construct a Put Message. To arbitrate between the PutMe flags, the Unicast Queuing logic 609 prioritizes flags according to the virtual channel priority levels. Within a priority level, Unicast Queuing logic 609 performs a round-robin algorithm between the PutMe flags.

When a Put Message is generated for a particular received buffer queue, the corresponding PutMe flag is cleared. The PutMe flag may later be set again when a Finish message is received for the queue, causing a new received buffer entry to become the new head of the buffer list.

Note that PutMe flags are not set by the addition of a new buffer to a non-empty list by a received header operation. In general, the state of the PutMe flag indicates whether a Put Message has been issued for the current head of the list, and should not reflect the state of items other than the head of the list.

Multicast Queuing logic 610 includes a set of 16 multicast queue entries for each G_Port 114. Each entry consists of a bit field, a virtual channel number, and a buffer number, implemented as a set of hardware registers.

Put Message Generator 611 accepts requests from Unicast Queuing logic 609 and from Multicast Queuing logic 610 for Put Message generation. In turn, Put Message Generator 611 selects between the two interfaces, and forwards Put Messages to CMI 411. Put Message Generator 611 also adds the contents of the Base Buffer Number Register to the local buffer number for the receiving G_Port 114. Put Message Generator 611 additionally provides a handshake with the Unicast and Multicast Queuing logic 609, 610 to allow for generation of additional Put Messages.

The Base Buffer Number register (included in the CPI Bus interface logic 401)specifies the starting buffer number to be used for received buffers for a G_Port 114. G_Port ASIC 111 contains one Base Buffer Number register for each of its two ports. The buffer number corresponding to a particular buffer descriptor is equal to the base buffer number plus the G_Port's 114 local buffer number (the offset of the buffer descriptor within the descriptor array for the port).

Internally, G_Port ASIC 111 uses the port's (G_Port 114) buffer number (starting at zero) for most list operations. However, when a Put Message is generated, the Base Buffer Number from this register (shown in Table 6) is added to the port's buffer number before being placed in the buffer number field of the message.

TABLE 6

| Base Buffer Number Register | |
|---|---|
| Bit(s) | Function |
| 15–13 | Reserved |
| 12–0 | Base Buffer Number |

Figure 7:
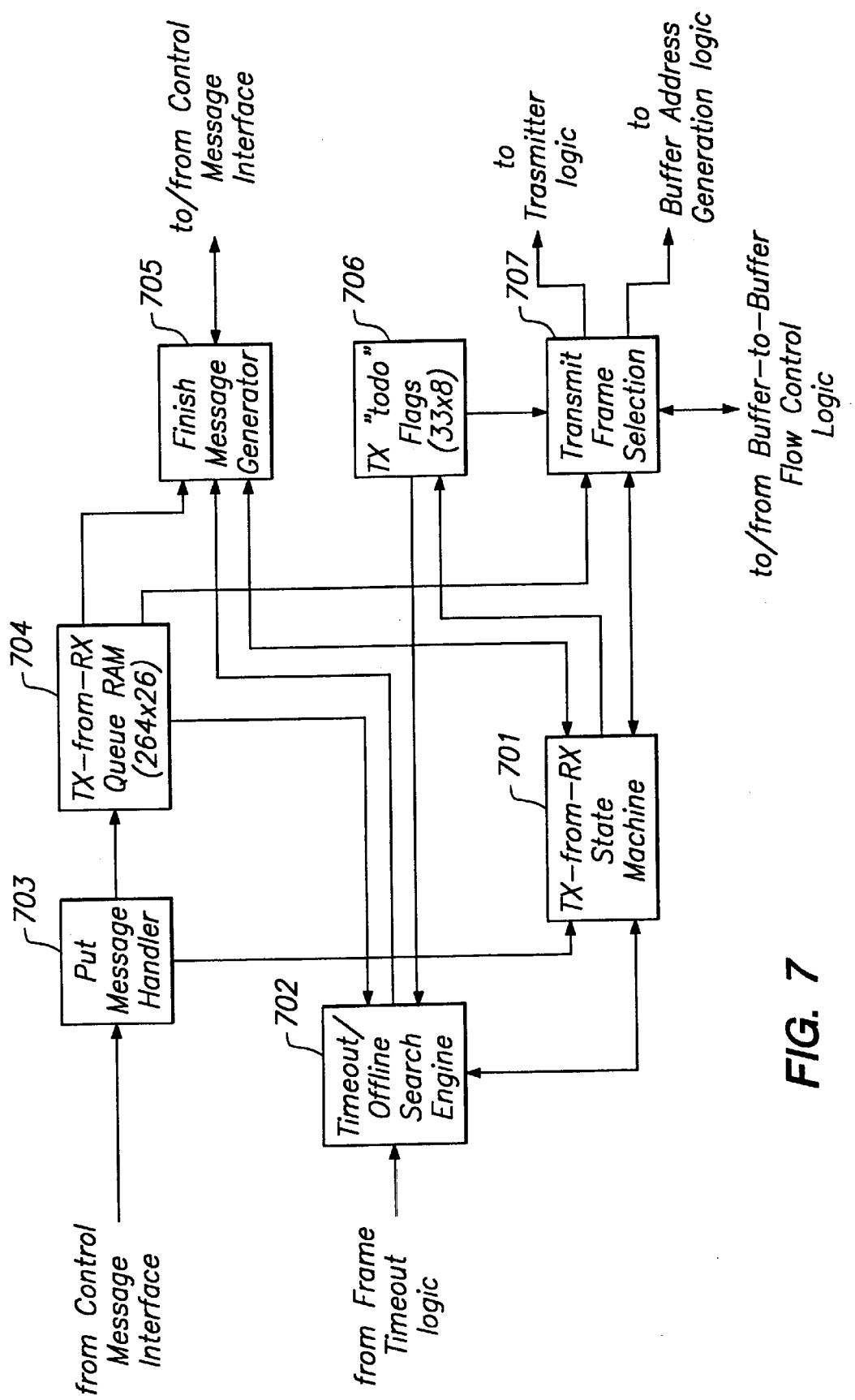
FIG. 7 is a block diagram of a TX-from-RX logic circuit shown in FIG. 4.

FIG. 7 is a block diagram of a TX-from-RX circuit 406 shown in FIG. 4. TX-from-RX logic 406 includes a TX-from-RX state machine 701, a Timeout/Offline search engine 702, a Put Message handler 703, a Queue RAM 704, a Finish Message generator 705, a flag memory 706 and a Transmit Frame Selection circuit 707. TX-from-RX state machine 701 accepts requests from the various sections of the TX-from-RX circuit 406 to perform cycles to a Queue RAM 704 and flags 706. TX-from-RX state machine 701 generates signals to control Queue RAM 704, as well as various strobes to Finish Message generator 705 and "todo" flags to indicate queue entry additions and deletions.

The operations performed on Queue RAM 704 include: (i) Put (write queue entry, set "todo" flag), (ii) Timeout/Offline (read queue entry, clear "todo" flag and send Finish message), (iii) Transmit Frame Selection (read queue entry, clear "todo" flag and send Finish message) and (iv) Embedded processor (read entry for debugging). Queue RAM 704 has one read-only port and one write-only port. The write-only port is dedicated to Put Message processing, while the read-only port is shared for the other functions.

To minimize latency for Transmit Frame Selection cycles, a fixed priority arbitration scheme is employed. The priorities are, in highest-to-lowest order: 1) Transmit Frame Selection, 2) Embedded Processor Accesses and 3) Timeout/Offline Processing.

Put Message handler 703 accepts Put Messages directed to the corresponding transmitting G_Port 114, and causes transmit frame queue entries to be constructed in Queue RAM 704. CMI 411 passes a Put Message to Put Message handler 703, which captures the information required to construct a queue entry in a register. On the following clock, the queue entry is written into Queue RAM 704, and the corresponding "todo" flag is set. Since the write port of the Queue RAM 704 is dedicated to Put Message processing, no arbitration for writes to Queue RAM 704 is required. When a cycle is performed, the contents of the Put Message buffer register are used to specify a Queue RAM buffer address (the source port number plus virtual channel ID) plus the contents of the entry. In addition, TX-from-RX state machine 701 generates a strobe to the TX "Todo" Flags, causing the flag corresponding to the new queue entry to be set.

Flags 706 are a set of hardware registers used to flag when an entry in the Queue RAM 704 describes a frame to be transmitted. There are eight "todo" flags per pair of possible receivers (receiving G_Ports 114) in a switch 100 (corresponding to one entry per virtual channel per pair of receivers in a remote G_Port ASIC 111). A "todo" flag is set when a Put Message is received, indicating a request to transmit a frame. The flag is cleared when the request is removed from the Queue RAM 704, due to a frame timeout, a port offline condition, or transmission of the frame by Transmit Frame Selection circuit 707.

Queue RAM 704 stores the information needed to describe a frame to be transmitted. The fields in an entry of this queue are shown in Table 7.

TABLE 7

Queue RAM Entry

| Bit(s) | Function |
|---|---|
| 26 | LSbit of RX port number |
| 25 | End_Sequence from F_CTL |
| 24–20 | Frame Timeout Deadline |
| 19–13 | Line Offset |
| 12–0 | Buffer Number |

All of these fields are taken from the Put Message that causes a frame to be queued. Since each entry in Queue RAM 704 is shared by a pair of receivers (G_Ports 114) within a source G_Port ASIC 111, an additional piece of information must be recorded to allow for addressing of the Finish message constructed from the queue entry. For this purpose, the least significant bit of the receiver's port number (from the "Source Port" field of the Put Message) is recorded in the queue entry.

The End_Sequence bit from the F_CTL field of the received frame will be forwarded to the TX-from-RX Queuing circuit 406 in a received Put Message.

The Frame Timeout Deadline from the Put Message is also recorded. This is used by the Timeout/Offline search engine 702 to examine queue entries for possible time-out conditions.

The Line Offset and Buffer Number fields describe the location of the frame in the central memory 108. These are forwarded to the Buffer Timing logic and Buffer Address Generation logic (included in buffer circuit 410) by transmit frame selection circuit 707 to start reading a frame for transmission.

Queue RAM 704 is implemented using a 264 word by 27 bit RAM for each G_Port 114. The address to a Queue RAM 704 is generated by concatenating the 6 most significant bits of the RX port number with the virtual channel number, with the virtual channel field forming the three least significant bits.

Transmit frame selection circuit 707 selects frames to transmit based on the bits set in the TX "Todo" Flags. The eight virtual channels have four different priority levels, 0 through 3. Level 0 has the highest priority. Transmit frame selection circuit 707 generates eight virtual channel frame transmission request signals by ORing together all TX "Todo" Flags within each virtual channel. It then ignores any virtual channel transmission requests for channels with no buffer-to-buffer credit. Of those remaining requests, Transmit frame selection circuit 707 selects the virtual channel with the highest priority.

If more than one virtual channel at a given priority level has frames to transmit, Transmit frame selection circuit 707 executes a "round-robin" fairness algorithm between virtual channels within that priority level.

When transmit frame selection circuit 707 has chosen a queue entry for frame transmission, a request is forwarded to TX-from-RX state machine 701 for a cycle to Queue RAM 704. This cycle removes the selected entry from Queue RAM 704, causing the Finish Message generator 705 to send a message to the originating receiver. In addition, strobes generated by transmit frame selection circuit 707 cause the Buffer Number and Line Offset fields from the queue entry to be loaded into the buffer logic 410 to start the buffer read operation.

Finish Message generator 705 is triggered by TX-from-RX state machine 701 to create a Finish message whenever an entry is removed from Queue RAM 704. Signals from the Timeout/Offline search engine 702 are used by the Finish Message generator 705 to specify the status in the message. With the exception of the "Source Port" parameter, the remaining Finish message fields are derived from the Queue RAM 704 address (receiving port number plus virtual channel ID) and the queue entry (for the least significant address of the receiving port number).

Finish Message generator 705 contains two registers to hold one Finish message queued for transmission on CMI 411, and one additional Finish message for over-lapped operations. To prevent overrun of these registers, TX-from-RX state machine 701 blocks accesses to Queue RAM 704 by the Transmit Frame selection logic 707 and the Timeout/Offline search engine 702 when both registers contain valid Finish messages.

Timeout/Offline search engine 702 removes queue entries (from Queue RAM 704) for frames that have timed out. In addition, Timeout/Offline search engine 702 removes all entries from the queue if the associated transmitter (transmitting G-Port 114) has gone offline.

Referring back again to FIGS. 1 and 4, each G_Port ASIC 111 includes a Control Message Interface (CMI) 411. A CMI 411 includes an eighteen bit wide input message port plus an eighteen bit wide output message port per G_Port ASIC 111. CMI 411 is used to forward a transmission request ("Put" message) from a receiving G_Port ASIC 111 to a transmitting G_Port ASIC 111 and to send completion status (a "Finish Message") from a transmitting G_Port ASIC 111 to a receiving G_Port ASIC 111.

CMIs 411 are connected to each other through message crossbar 102. Each G_Port ASIC 111 time-slices its output message port to each possible destination G_Port ASIC 111 in switch 100. If a particular G_Port ASIC 111 has a message to send to a particular destination G_Port ASIC 111 during the corresponding timeslot, the G_Port ASIC 111 will use the timeslot to send the message; otherwise, the output message port lines will be driven to indicate no message is present.

The timeslicing of the output message ports of the G_Port ASIC 111 are arranged out of phase from each other, such that, in any given clock cycle, each G_Port ASIC 111 output message port is time-sliced to a different destination G_Port ASIC 111. Thus, messages appearing at the input port of a given G_Port ASIC 111 will also be time-sliced through each possible source G_Port ASIC 111 in switch 100.

Message crossbar 102 requires two clocks to transport a message from a source G_Port ASIC 111 output message port to a destination G_Port ASIC 111 input message port. Each time-slice to a given destination consists of two clocks, which is the amount of time required to send a single message to a destination G_Port ASIC 111.

Figure 11:
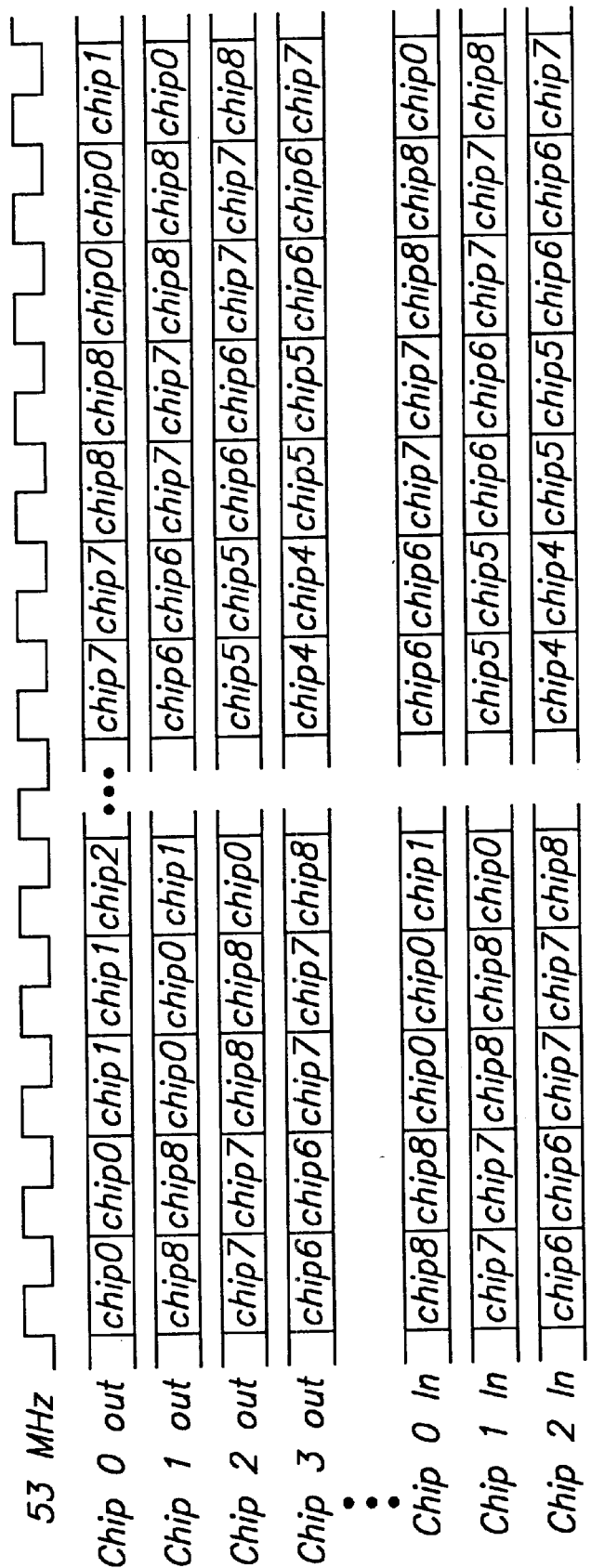
FIG. 11 is a timing diagram of the barrel shift message passing method used in the switch shown in FIG. 1.

A timing diagram illustrating the operation of message crossbar 102 is shown in FIG. 11.

Message crossbar 102 has a plurality of connectivity states, each state having a plurality of G_Port 111 to G_Port 111 connections. Message crossbar 102 cycles through the plurality of connectivity states to connect each G_Port 111 to each other G_Port 111. CMI 411 includes a circuit that determines the current connectivity state using the B_M_Index generated by index pulse generator 1201 a counter.

Recipient G_Port ASICs 111 are free to reuse a receive buffer when it receives notification that the frame has been transmitted. Multiple notifications are required, in the case of multicast, to determine when a receive buffer is freed.

Two messages are defined for transfer across CMI 411; Put and Finish. A Put Message is used by a receiving G_Port ASIC 111 to inform a transmitting G_Port ASIC 111 that a frame it should forward has arrived. The Put Message is used for both unicast and multicast; multiple Put Messages are issued for received multicast frames. The format of a Put Message is shown in Table 8.

TABLE 8

Put Message Format

| Word | Bits | Function |
|---|---|---|
| 0 | 17 | Msg present bit, |
|   |   | 0 = message present, 1 = no message present |
| 0 | 16–15 | Op Code bits 0,1 = Put Message |
| 0 | 14–2 | System wide buffer number |
| 0 | 1 | not used |
| 0 | 0 | Port number of originating receiver |
| 1 | 17 | Port number of destination transmitter |
| 1 | 16–14 | Virtual Channel number |
| 1 | 13 | End_Sequence bit from F_CTL of RXframe |
| 1 | 12 | reserved |
| 1 | 11–7 | timeout value |
| 1 | 6–0 | line offset |

The destination G_Port ASIC 111 and source G_Port ASIC 111 numbers are inferred by the position within the message time-slice in which the message is launched (or received). However, since each G_Port ASIC 111 contains two Fibre Channel ports (two G_Ports 114), a bit for the source receiver port number and a bit for the destination transmitter port number is required to fully determine the source and destination port numbers for the message.

A three bit wide Virtual Channel field is used to indicate the virtual channel on which the frame is to be forwarded.

The End_Sequence bit of the F_CTL of a received frame is captured and forwarded in a Put Message for use by the prioritization logic in the G_Port ASIC 111 transmit queuing logic.

Five bits are allocated to a Time Stamp value in a Put Message to be used for timeout processing.

The Line Offset value indicates the 32 bit word offset within a buffer line of the start-of-frame word 302 for a received frame 300.

The Buffer Number forwarded in a Put Message is the switch-wide number of the buffer in central memory 108 in which the frame 300 has been stored.

A Finish message is used by a transmitting G_Port ASIC 111 to inform a recipient G_Port ASIC 111 that the transmitter has completed transmission of a frame 300. The format of a Finish message is shown in Table 9.

TABLE 9

Finish Message Format

| Word | Bits | Function |
|---|---|---|
| 0 | 17 | Msg present bit, |
|   |   | 0 = message present, 1 = no message present |
| 0 | 16–15 | Op Code bits 1,1 = Finish message |
| 0 | 14–2 | System wide buffer number |
| 0 | 1 | not used |
| 0 | 0 | destination receiver port number |
| 1 | 17 | Port number of originating transmitter |
| 1 | 16–14 | Virtual Channel number |
| 1 | 13–12 | Status |
| 1 | 11–0 | not used |

As with Put Messages, the source and destination G_Port ASIC 111 numbers are constructed using the message time-slice plus the transmitter port (a first G_Port ASIC 111) number and receiver port (a second G_Port ASIC 111) number bits in the body of the message.

Values for the status field of a Finish message are shown in Table 10.

TABLE 10

Finish Message Statues

| Value(s) | Meaning |
|---|---|
| Ox7F - 4 | Reserved |
| 3 | Receiver Flushed |
| 2 | Transmitter Unavailable |
| 1 | Timeout Detected |
| 0 | Successful Operation |

A "Reciever Flushed" status is returned if embedded CPU 103 has forced all entries associated with a particular receiving G_Port ASIC 111 to be flushed from the destination port (another G_Port ASIC 111).

The "Transmitter Unavailable" status indicates that the destination G_Port ASIC 111 has been marked available by the embedded CPU 103.

A "Timeout Detected" status is sent by a transmitter if it has detected a timeout on the frame 300.

"Successful Operation" status will be returned in the absence of the statuses described above.

From the description, it will be apparent that the invention disclosed herein provides a novel and advantageous Fibre Channel switching system and method. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A switch fabric comprising a plurality of interconnected switches, at least one of said plurality of switches temporarily storing a data frame received at a receive port of a plurality of fiber optic ports, the switch including:

a central memory including a plurality of memory modules;

a data path control circuit for sequentially coupling the receive port to ones of the memory modules during a timeslot allocated for writing from the receive port to the memory module, wherein the data path control circuit couples the receive port to the memory modules frequently enough to support continuous writing of data from the receive port to the central memory, and a port circuitry for writing a portion of the data frame from the receive port to ones of the memory modules during the timeslot allocated for such writing, wherein the data frame is written across the memory modules.

2. The fabric of claim 1 wherein the data path control circuit couples the receive port to the memory modules frequently enough to support continuous writing of data from the receive port to the central memory and couples the transmit port to the memory modules frequently enough to support continuous reading of data from the central memory to the transmit port.

3. A switch fabric comprising a plurality of interconnected switches, at least one of said plurality of switches temporarily storing a data frame received at a receive port of a plurality of fiber optic ports, the switch including:

a central memory including a plurality of memory modules;

a data path control circuit for sequentially coupling the receive port to ones of the memory modules during a timeslot allocated for writing from the receive port to the memory module; and a port circuitry for writing a first portion of the data frame to a first memory module during a first available timeslot; and further for writing the remaining portions of the data frame to other memory modules during subsequent timeslots.

4. A switch fabric comprising a plurality of interconnected switches, at least one of said plurality of switches temporarily storing a data frame received at a receive port of a plurality of fiber optic ports and destined for a transmit port of the plurality of fiber optic ports, the switch including:

a central memory including a plurality of memory modules;

a data path control circuit for
sequentially coupling the receive port to ones of the memory modules during a timeslot allocated for writing from the receive port to the memory module; and
sequentially coupling the transmit port to ones of the memory modules during a timeslot allocated for reading from the memory module to the transmit port; and a port circuitry for
writing a portion of the data frame from the receive port to ones of the memory modules during the timeslot allocated for such writing, wherein the data frame is written across the memory modules, wherein for each memory module the timeslots allocated for writing to the memory module are contiguous in time; and
reading a portion of the data frame from the individual memory modules to the transmit port during the timeslot allocate for such reading, wherein the data frame is read to the transmit port, wherein for each memory module the timeslots allocated for reading from the memory module are contiguous in time.

5. The fabric of claim 4 wherein the contiguous timeslots allocated for writing are separated from the timeslots allocated for reading by at least one timeslot.

6. A switch fabric comprising a plurality of interconnected switches, at least one of said plurality of switches retrieving a temporarily stored data frame destined for a transmit port of a plurality of fiber optic ports, the switch including:

a central memory including a plurality of memory modules for storing a data frame across the memory modules;

a data path control circuit for sequentially coupling the transmit port to ones of the memory modules during a timeslot allocated for reading from the memory module to the transmit port, wherein the data path control circuit couples the transmit port to the memory modules frequently enough to support continuous reading of data from the central memory to the transmit port; and a port circuitry for reading a portion of the data frame from the memory module to the transmit port during the timeslot allocated for such reading, wherein the data frame is read to the transmit port.

7. A switch fabric comprising a plurality of interconnected switches, at least one of said plurality of switches switching a data frame from a receive port of a plurality of fiber optic ports to a transmit port of the plurality of fiber optic ports, the switch including:

a central memory including a plurality of memory modules, and wherein the central memory is subdivided into a plurality of frame buffers, each frame buffer including a portion of each memory module;

a data path control circuit for sequentially coupling the receive port to ones of the memory modules during a timeslot allocated for writing from the receive port to the memory module and further for sequentially coupling the transmit port to ones of the memory modules during a timeslot allocated for reading from the memory module to the transmit port, wherein the data path control circuit couples each port to each memory module in a regular sequence for writing to the memory module and couples each port to each memory module in a regular sequence for reading from the memory module, all of the timeslots being of equal duration;

a receive port circuitry for writing a portion of the data frame from the receive port to ones of the memory modules during the timeslot allocated for such writing, wherein the data frame is written to one of the frame buffers;

a message path for sending a message from the receive port to the transmit port indicating availability of the data frame in the central memory; and a transmit port circuitry for, responsive to receipt of the message indicating availability of the data frame, reading the portions of the data frame from the ones of the memory modules to the transmit port during the timeslot allocated for such reading, wherein the data frame is read to the transmit port.

8. The fabric of claim 7 wherein:

a first portion of the data frame is written to a first memory module during a first available timeslot;

the remaining portions of the data frame are written to other memory modules during subsequent timeslots; and the message identifies the first memory module and the frame buffer to which the data frame is written.

* * * * *